United States Patent
Araya

(10) Patent No.: US 10,416,917 B2
(45) Date of Patent: Sep. 17, 2019

(54) LINKING SERVER AND INFORMATION PROCESSING METHOD

(71) Applicant: KYOCERA Document Solutions Inc., Osaka (JP)

(72) Inventor: Takeshi Araya, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/903,763

(22) Filed: Feb. 23, 2018

(65) Prior Publication Data

US 2018/0239554 A1    Aug. 23, 2018

(30) Foreign Application Priority Data

Feb. 23, 2017  (JP) .................... 2017-031914

(51) Int. Cl.
G06F 12/00    (2006.01)
G06F 3/06     (2006.01)
G06F 3/12     (2006.01)

(52) U.S. Cl.
CPC ............ *G06F 3/0646* (2013.01); *G06F 3/067* (2013.01); *G06F 3/0619* (2013.01); *G06F 3/0638* (2013.01); *G06F 3/1207* (2013.01); *G06F 3/1229* (2013.01); *G06F 3/1285* (2013.01)

(58) Field of Classification Search
CPC ...... G06F 3/0646; G06F 3/0638; G06F 3/067; G06F 3/0619; G06F 3/1285; G06F 3/1207; G06F 3/1229
See application file for complete search history.

(56) References Cited

U.S. PATENT DOCUMENTS 5,584,008 A * 12/1996 Shimada ............... G06F 3/0601
                                                711/112
2016/0132261 A1* 5/2016 Matsutani ............. G06F 3/0619
                                                711/114

FOREIGN PATENT DOCUMENTS

JP        2000-047535 A      2/2000

* cited by examiner

*Primary Examiner* — Kalpit Parikh
(74) *Attorney, Agent, or Firm* — Hawaii Patent Services; Nathaniel K. Fedde; Kenton N. Fedde

(57) ABSTRACT

Provided is a linking server that can easily link outputted data with another system. The linking server includes: a communication unit that is capable of communicating between a management server that collects one or more pieces of operating information from one or more image forming apparatus, and an external system that performs processing using the one or more pieces of operating information; a storage unit; an input/output unit that acquires the one or more pieces of operating information that is outputted from the management server, and stores that operating information in the storage unit; and a packaging unit that acquires the one or more pieces of operating information, generates compressed data by performing a compression process and a packaging process, and writes the generated compressed data back into the storage unit; wherein the input/output unit outputs the compressed data to the external system.

4 Claims, 6 Drawing Sheets

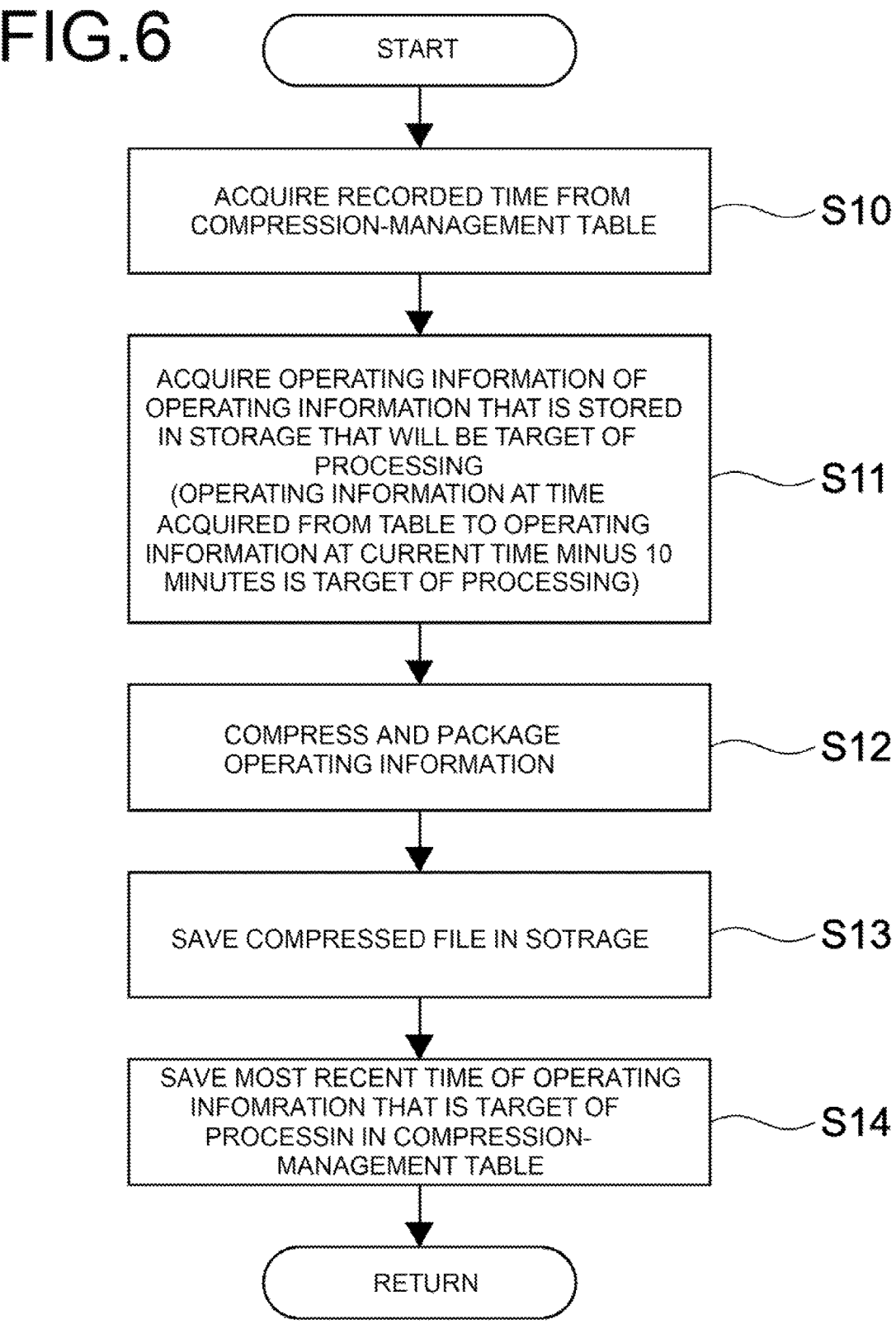

LINKING SERVER AND INFORMATION PROCESSING METHOD

INCORPORATION BY REFERENCE

This application is based on and claims the benefit of priority from Japanese Patent Application No. 2017-031914 filed on Feb. 23, 2017, the contents of which are hereby incorporated by reference.

BACKGROUND

The present disclosure relates to a linking server that outputs (backups) data from one system and links that data to another system, and to an information processing method.

There are various methods for backing up data from one system. For example, in typical technology, backup is performed by uploading internal data of an image forming apparatus (MFP, Multifunction Peripheral) to a communication adapter on a network.

SUMMARY

One form of a linking server according to the present disclosure includes a communication unit, a storage unit, an input/output unit, and a packaging unit. The communication unit is capable of communication with a management server that collects one or more pieces of operating information from one or more image forming apparatus, and an external system that performs processing using the one or more pieces of operating information. The input/output unit acquires the one or more pieces of operating information that is outputted from the management server, and stores the operating information in the storage unit. The packaging unit acquires the one or more pieces of operating information that is stored in the storage unit, and generates compressed data by performing a compression process and packaging process, then writes the generated compressed data back in the storage unit. The input/output unit outputs the compressed data that is written back in the storage unit to the external system.

In one form of an information processing method according to the present disclosure, one or more pieces of operating information that are outputted from a management server that collects one or more pieces of operating information from one or more image forming apparatus are acquired and stored in a storage unit. The one or more pieces of operating information that are stored in the storage unit are acquired, compressed data is generated by performing a compressing process and a packaging process, and the generated compressed data is written back in the storage unit. The compressed data that is written back in the storage unit is outputted to an external system that performs processing using the one or more pieces of operating information. A computer executes the method described above.

BRIEF DESCRIPTION OF THE DRAWINGS

FIG. 6 is a flowchart for explaining the flow of the compression and packaging processes by the packaging unit 71a.

DETAILED DESCRIPTION

In the following, an embodiment according to the present disclosure will be explained with reference to the drawings.

[Overview]

First, an overview will be explained.

One embodiment of a linking-server according to the present disclosure is a linking server that receives and delivers collected operating information between a management system and a different system that is provided outside of the management system (hereafter, referred to as an external system). The management system collects operating information such as counter information, toner information, error information and the like from image forming apparatuses that are installed at customer sites, and manages these image forming apparatuses.

In the following, first, an overview of the management system will be explained, after which the linking server will be explained.

In addition, the linking server may be configured as one server, or may be configured by combining service that are provided by a cloud service. Here, after the configuration of a linking server that is one server is explained, an example when the linking server is configured by a combination of cloud services will be explained.

[Management System]

Figure 1:
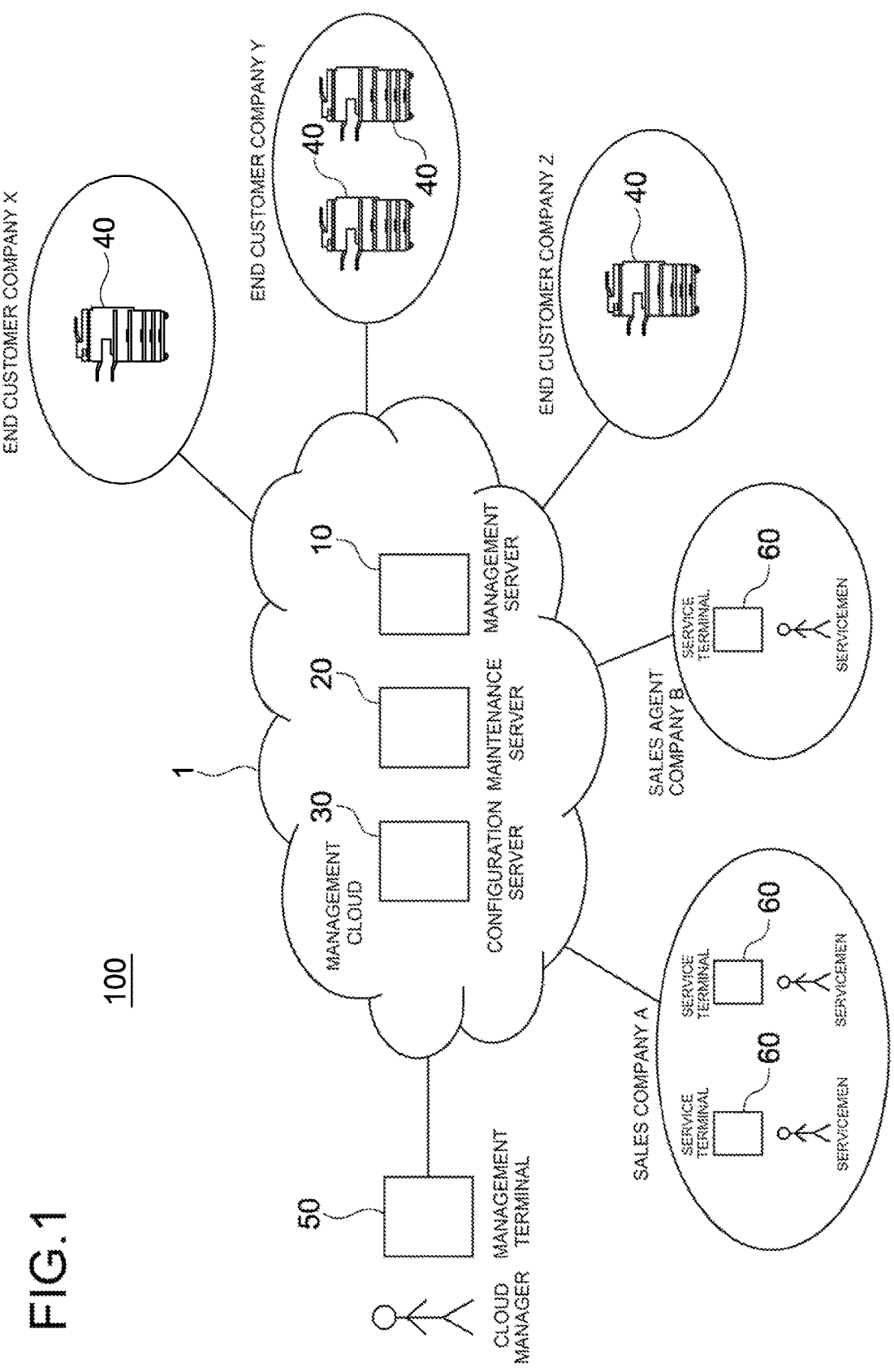
FIG. 1 is a diagram for explaining an overview of a management system 100.

Next, an overview of the management system described above will be explained. FIG. 1 is a diagram for explaining and overview of a management system 100.

The management system 100 includes a management server 10 in a management cloud 1, and image forming apparatuses 40 as targets that are managed by the management server 10.

In addition, the management cloud 1 includes a configuration server 30 that manages the configuration of the image forming apparatuses 40 that are managed by the management cloud 1, and a maintenance server 20 that performs maintenance of the image forming apparatuses 40 that are managed by the management cloud 1.

Moreover, the cloud manager manages the management cloud 1 by access the management cloud 1 from a management terminal 50 that performs management of the management cloud 1.

The image forming apparatuses 40 that are installed at end customers company X, company Y and company Z that use the image forming apparatuses 40 are managed remotely from the management cloud 1 via a network. Furthermore, each of the image forming apparatuses 40 notify the management server 10 of operating information such as counter information, toner information, error information and the like, and the management server 10 outputs the collected operating information to a linking server.

A servicemen of sales company A and sales agent company B (may include salesmen) are users of the management cloud 1 in order to perform maintenance and the like of the image forming apparatuses 40 of each of the end customers. Then, the servicemen access the management cloud 1 via service terminals 60, and perform remote maintenance of the image forming apparatuses 40 that are installed at each of the end customer sites.

An overview of the management system 100 is explained above.

[Linking Between Systems]

Figure 2:
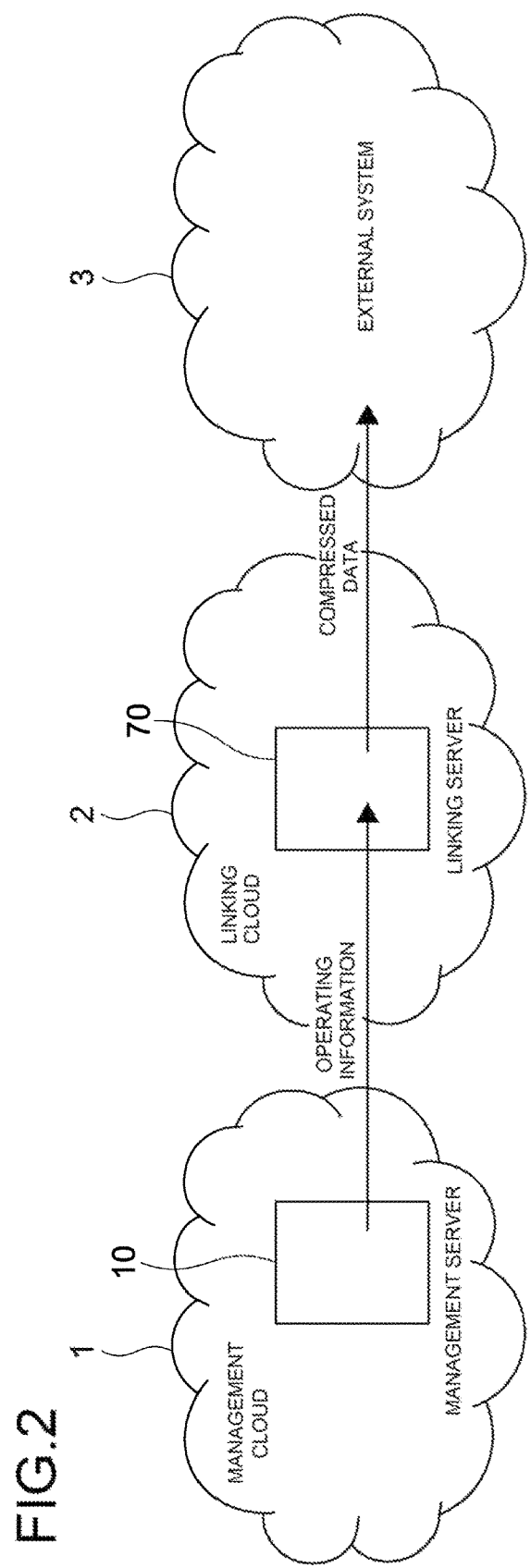
FIG. 2 is a diagram for explaining the relationship between a linking server 70 and a management server 10 in the management system 100 and an external system 3 of one embodiment according to the present disclosure.

Next, the relationship between the linking server and the management server 10 in the management system 100 and an external system of an embodiment according to the present disclosure will be explained. FIG. 2 is a diagram for explaining the relationship between the linking server 70 and the management server 10 in the management system 100 and an external system 3 of one embodiment according to the present disclosure.

First, the management server 10 outputs operating information that is collected from the image forming apparatuses 40 to the linking server 70 in the linking cloud 2. The outputted operating information is stored in the storage unit of the linking server 70.

Next, the linking server 70 generates compressed data by compressing the operating information that is stored in the storage unit. The generated compressed data is stored in the storage unit.

Next, the external system 3 acquires the compressed data that is stored in the linking server 70. After acquiring the compressed data, the external system 3 decompresses the compressed data and performs various processing using the decompressed data.

In addition, the output of operating data from the management server 10, the generation process for generating compressed data by the linking server 70 and the acquisition process for acquiring compressed data from the external system 3 are performed asynchronously. Each process may be performed by batch processing. Therefore, the coupling between these systems becomes a loose coupling, and when compared with linking between systems that are connected online, it is possible to freely perform stopping, maintenance and the like of the systems.

The relationship between the linking server 70 and the management server 10 in the management system 100 and an external system 3 of an embodiment according to the present disclosure is explained above.

[Configuration of the Linking Server]

Next, the configuration of the linking server 70 will be explained. The linking server 70 may be configured using dedicated hardware or software, or may be configured using a typical computer. A configuration diagram when the linking server 70 is configured using a typical computer is illustrated in FIG. 3.

Figure 3:
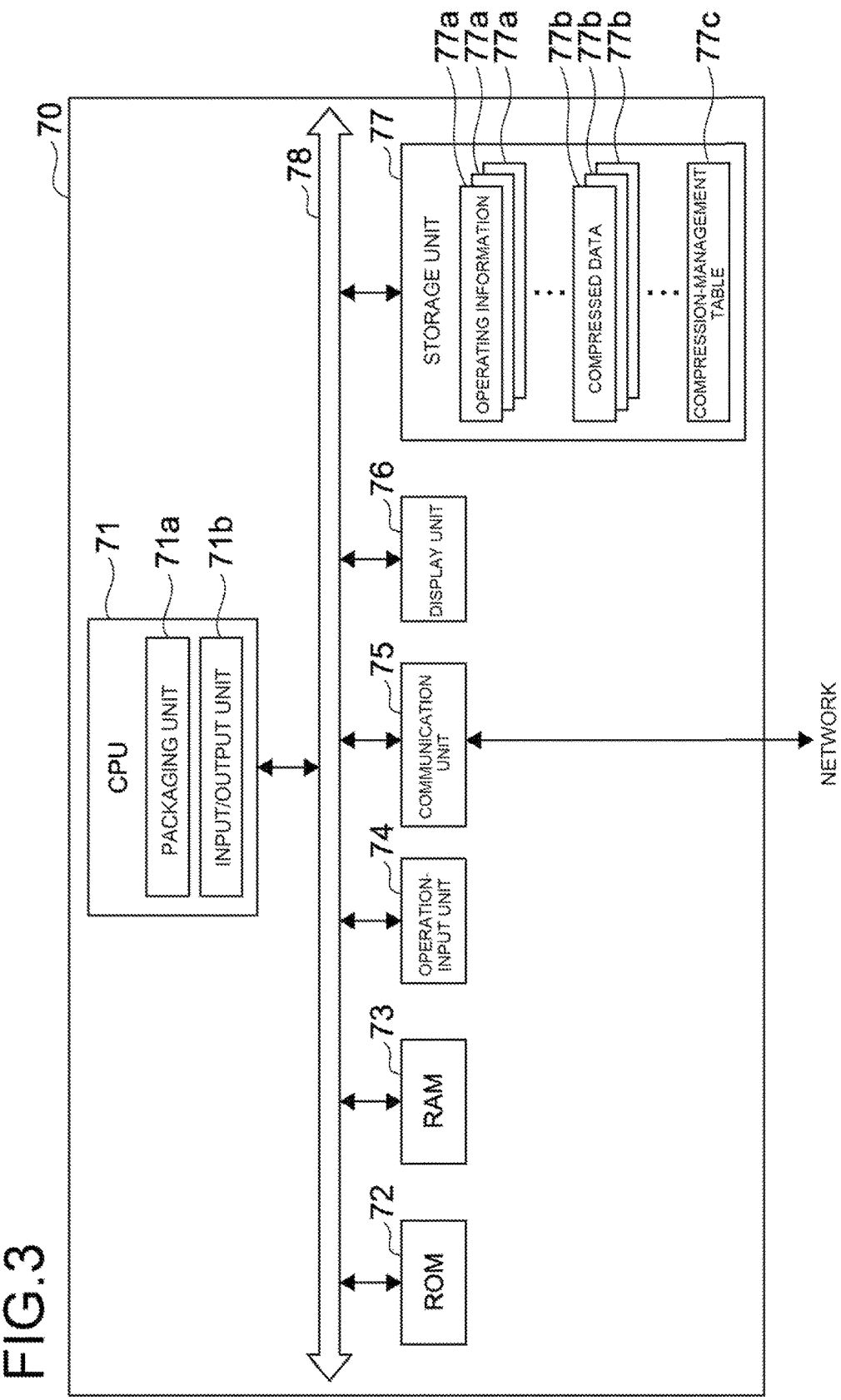
FIG. 3 is a configuration diagram when the linking server 70 is configured by a typical computer.

As illustrated in FIG. 3, the linking server 70 has a CPU (Central Processing Unit) 71, a ROM (Read Only Memory) 72, a RAM (Random Access Memory) 73, an operation-input unit 74, a communication unit 75, a display unit 76, and a storage unit 77, and each of these blocks are connected via a bus 78.

The ROM 72 stores plural programs and data such as firmware for executing various processes and the like. The RAM 73 is used as work area for the CPU 71, and temporarily stores an OS (Operating System), various applications that are being executed, and various data that are being processed.

The storage unit 77 is, for example, a HDD (Hard Disk Drive), a flash memory or other non-volatile memory. The storage unit 77 stores an OS, various applications, various data, operating information 77a, compressed data 77b, and a compression-management table 77c.

The operating information 77a is operating information such as counter information, toner information, error information and the like that the management server 10 collects from each of the image forming apparatuses 40, and the linking server 70 stores in the storage unit 77.

The compressed data 77b is a data file in which data of the operating information 77a is compressed and packaged by the linking server 70.

The compression-management table 77c stores time information that is used when determining operating information 77a that will be the target of processing when the linking server 70 performs processing to compress and package the operating information 77a. The time that is stored as this time information is the time of the most recent operating information 77a of the operating information 77a that is compressed and packaged last.

For example, when the compression and packaging processes are performed on the operating information 77a up to the data at 14:50 on Feb. 3, 2017, this time "Feb. 3, 2017; 14:50" is recorded in the compression-management table 77c.

The communication unit 75 is connected with a network for performing the exchange of information with the management server 10 and external system 3.

The CPU 71 expands a program from among the plural programs that are stored in the ROM 72 or the storage unit 77 that corresponds to a command that is given from the operation-input unit 74 in the RAM 73, and performs appropriate control of the display unit 76 and the storage unit 77 according to this expanded program.

The operation-input unit 74 is, for example, a pointing device such as a mouse or the like, a keyboard, a touch panel, or some other operation apparatus.

The display unit 76 is, for example, a liquid-crystal display, an EL (Electro-Luminescence) display, a plasma display or the like.

Next, the functional blocks that are achieved by the program that is executed by the CPU 71 will be explained.

The functional blocks that are achieved by the CPU 71 of the linking server 70 are the packaging unit 71a and the input/output unit 71b.

The packaging unit 71a compresses and packages the operating information 77a that is stored in the storage unit 77. The packaging unit 71a stores a compressed and packaged file in the storage unit 77.

In addition, the packaging unit 71a references the time that is recorded in the compression-management table 77c in order to determine the operating information 77a that is to be the target when performing processing on the operating information 77a. Together with that, at the instant when the compression and packaging processes are finished, the packaging unit 71a records the time of the most recent operating information of the processed operating information 77a in the compression-management table 77c.

The input/output unit 71b acquires operating information 77a that is outputted from the management server 10, and stores that operating information 77a in the storage unit 77. Moreover, the input/output unit 71b acquires compressed data 77b that is stored in the storage unit 77 from the storage unit 77 according to an output request from the external system 3, and outputs that compressed data 77b to the external system 3.

The configuration of the linking server 70 is explained above.

[Configuration as a Linking Cloud Service]

Figure 4:
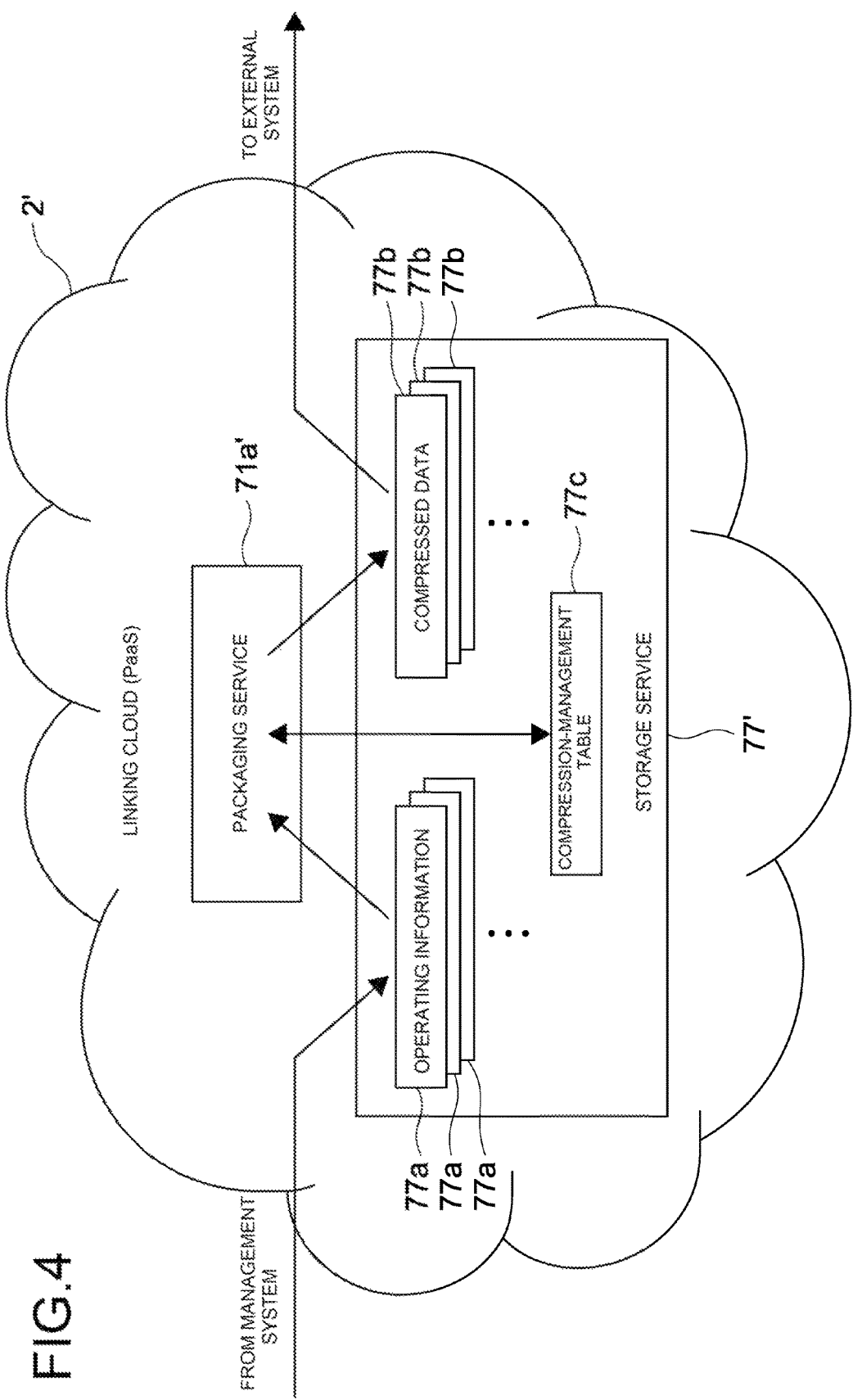
FIG. 4 is a configuration diagram when the linking server 70 is configured as a service on a linking cloud 2'.

Next, configuration is explained for the case mentioned above in which the linking server 70 is configured as a service on a linking cloud 2'. FIG. 4 is a configuration diagram for the case in which the linking server 70 is configured as a service on a linking cloud 2'.

On a linking cloud 2' that is configured as a PaaS (Platform as a Service), a packaging server 71a' and a storage service 77' are provided.

The packaging service 71a' has a function that is the same as that of the packaging unit 71a described above, and the storage service 77' is a service that combines the functions of the storage unit 77 and the input/output unit 71b described above.

First, the management server 10 accesses the storage service 77', and stores operating information 77a in a specified folder inside the storage service 77'.

Next, based on the time that is recorded in the compression-management table 77c, the packaging service 71a' acquires operating information 77a from the specified folder inside the storage service 77', and performs a compression process and a packaging process. The compressed data 77b that is the result of processing is written back in the storage service 77'.

After that, the external system 3 accesses the storage service 77', and acquires the compressed data 77b that is stored.

The configuration of the case in which the linking server 70 described above is configured as a service on the linking cloud 2' is explained above.

[Overall Flow of Processing]

Figure 5:
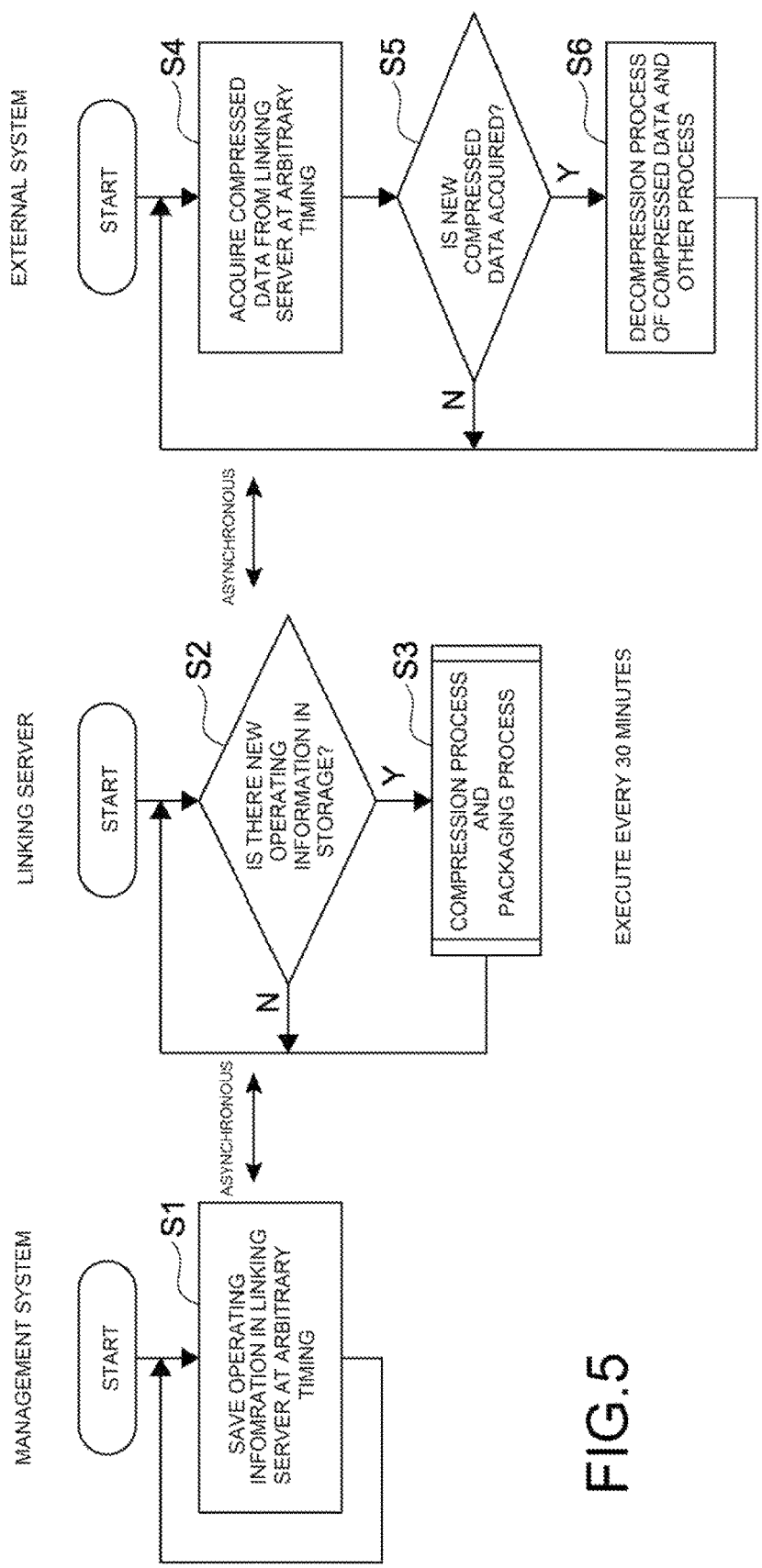
FIG. 5 is a flowchart for explaining the flow of overall processing that includes the management server 10, the linking server 70 and the external system 3.

Next, the overall flow of processing, including the management server 10, the linking server 70 and the external system 3 will be explained. FIG. 5 is a flowchart for explaining the overall flow of process, including the management server 10, the linking server 70 and the external system 3.

In addition, as illustrated in FIG. 5, processing by the management server 10, processing by the linking server 70 and processing by the external system 3 are asynchronous, and can be executed at arbitrary timing.

As illustrated on the left side of FIG. 5, in the management server 10, processing for saving operating information 77a that is collected from image forming apparatuses 40 at arbitrary timing in the linking server 70 is performed (step S1).

As illustrated in the center of FIG. 5, in the linking server 70, the packaging unit 71a determines every 30 minutes, for example, whether or not new unprocessed operating information 77a is stored in the storage unit 77 (step S2). In addition, here, this determination is performed every 30 minutes, however, this time interval can be appropriately adjusted according to the amount of data from the management server 10 that is to be linked to the external system 3, and the storage capacity for storing the data.

When there is new operating information 77a (step S2: YES), the packaging unit 71a performs the compression and packaging processes on the operating information 77a (step S3).

When there is no new operating information 77a (step S2: NO), the packaging unit 71a without doing anything waits for the next activation timing.

As illustrated on the right side of FIG. 5, in the external system 3 acquisition of the compressed data 77b from the linking server 70 is attempted at an arbitrary timing (step S4).

After acquisition of compressed data is attempted, the external system 3 determines whether or not new compressed data is acquired (step S5).

When new compressed data is acquired (step S5: YES), the external system 3 decompresses the acquired compressed data and performs the necessary processing on the decompressed data (step S6).

When new compressed data is acquired (step S5: NO), the external system 3 waits until the timing for acquiring the next compressed data.

The overall flow of processing, including the management server 10, the linking server 70 and the external system 3 is explained above.

[Flow of the Compression and Packaging Processes]

Next, the flow of the compression and packaging processes by the packaging unit 71a will be explained. FIG. 6 is a flowchart for explaining the compression and packaging processes by the packing unit 71a.

First, the packaging unit 71a reads the recorded time from the compression-management table 77c that is stored in the storage unit 77 (step S10). This time is the time of the most recent operating information 77a from among the previously processed operating information 77a.

For example, the case in which the time when the previous compression and packaging processes were performed is Feb. 3, 2017; 15:00 will be explained. Presuming that the operating information 77a up to 10 minutes before that time (this will be described in detail later) is the target of processing, the time "Feb. 3, 2017; 14:50" is recorded, for example, in the compression-management table 77c.

Next, the packaging unit 71a acquires operating information 77a of the operating information 77a that is stored in the storage unit 77 that will be the target of processing (step S11). In addition, being the target of processing referred to here means that operating information 77a having the time after the operating information 77a that is the target of the previous processing up to the operating information 77a having the current time minus 10 minutes.

The reason that only the operating information 77a of 10 minutes before the current time is set as the processing target is that there is a possibility that operating information 77a that is near the current time is still in the process of being stored in the storage unit 77 by the management server 10. In addition, here, the amount of time (set amount of time) that is subtracted from the current time is 10 minutes, however is not limited to this value, and as long as it is possible to acquire operating information 77a for stably performing the compression and packaging processes, the value can be any value.

In the example above, the case is explained in which the time when the compression and packaging processes are executed this time is Feb. 3, 2017; 15:30. The operating information 77a that will be the target of processing is the operating information 77a of the operating information 77a that is stored in the storage unit 77 from the time "Feb. 3, 2017; 14:51" to "Feb. 3, 2017; 15:20".

Next, the packaging unit 71a compresses the acquired operating information 77a and packages that information into one file in zip format or the like (step S12). In addition, the compressed format may be any format as long as the format can be decompressed by the external system. Moreover, the packaging method may be any method as long as packaging is performed so that after decompression by the external system that acquires the compressed data 77b, the original counter information, toner information, error information and the like of each of the image forming apparatuses 40 are in a retrievable format.

Next, the packaging unit 71a saves the compressed and packaged file in the storage unit 77 (step S13).

Next, the packaging unit 71*a* records the time of the most recent operating information 77*a* that was the target of processing in the compression-management table 77*c* (step S14). In addition, when recording the time in the compression-management table 77*c*, the time may be recorded in a form of being written over the old time that is already recorded.

The flow of the compression and packaging processes by the packaging unit 71*a* is explained above.

[Folder Names and File Names]

Next, the file names of the files in which the operating information 77*a* and the compressed data 77*b* are stored inside the storage unit 77, and the folder name of the folder in which these files are stored will be explained.

These file names and folder names are preferably given names that correspond to the time of the included data so that the time of the information that is stored in the files and folders is easily known.

For example, when the information that is stored in the storage unit 77 as operating information 77*a* is counter information of an image forming apparatus 40, the file name is saved in the format "Device ID-Counters-yyymmdd-hhmmss.txt". The Device ID is the ID of the image forming apparatus 40 that generated the counter information, yyyymmdd is the year, month and day, and hhmmss is the hour, minutes and seconds. Overall, the file name represents the time when that counter information was generated.

Moreover, the counter information described above may be stored in the storage unit 77 in a folder having the folder name "counters-yyyymmdd". This folder stores counter information of all of the image forming apparatuses 40 for one day.

By providing folder names and file names that include time information when storing compressed data 77*b* that is generated by the packaging unit 71*a* in the storage unit 77 as well, it becomes easier for the external system 3 to know the contents when acquiring data.

For example, the name of the compressed data 77*b* is preferably saved in the format "yyyymmdd-hhmm_hhmm.zip". In the example described above, the actual file name would be "20170203-1451_1520.zip".

Moreover, the folder name of the folder in which compressed data is saved can be in the format such as "SMS-integration-yyyymm". Here, SMS is the name of the external system 3, and yyyymm is the year and month. This folder stores all of the compressed data 77*b* of a certain month.

The file names of files in which operating information 77*a* and compressed data 77*b* are stored in the storage unit 77, and folder names of folders in which these files are stored is explained above.

In typical technology described above, it is not possible to link internal data that is backed up with another system.

Taking that situation into consideration, the object of the technology according to the present disclosure is to provide a linking server and information processing method that are capable of easily linking outputted data with another system.

[Supplemental Matter]

As described above, the linking server 70 according to the present disclosure includes: a communication unit 75 that is capable of communication between a management server 10 that collects one or more pieces of operating information from one or more image forming apparatus 40 and an external system 3 the performs processing using the one or more pieces of operating information; a storage unit 77; an input/output unit 71*b* that acquires the one or more pieces of operating information that is outputted from the management server 10 and stores the operating information in the storage unit 77; and a packaging unit 71*a* that acquires the one or more pieces of operating information that is stored in the storage unit 77, generates compressed data by performing a compression process and a packaging process, and writes the generated compressed data back in the storage unit 77; wherein the input/output unit 71*b* outputs the compressed data that is written back in the storage unit 77 to the external system 3.

Therefore, outputted data can be easily linked with another system.

Moreover, the technology according to the present disclosure is not limited to the embodiment described above, and of course various modification can be made with a range that does not depart from the gist of the present disclosure.

What is claimed is:

1. A linking server, comprising:
a communication unit that is capable of communication with a management server that collects one or more pieces of operating information from one or more image forming apparatuses, and an external system that performs processing using the one or more pieces of operating information;
a storage unit;
an input/output unit that acquires the one or more pieces of operating information as an output from the management server, and stores the acquired one or more pieces of operating information in the storage unit; and
a packaging unit that acquires the one or more pieces of operating information that is stored in the storage unit, generates compressed data by performing a compression process and a packaging process, and writes the generated compressed data back in the storage unit; wherein
the input/output unit outputs the compressed data that is written back in the storage unit to the external system;
the storage unit stores a compression-management table in which a time of the most recent operating information of the operating information that is processed last by the packaging unit is recorded; and
the packaging unit determines whether or not new unprocessed operating information to be subjected to the compression process is stored in the storage unit, and when there is the new operating information, refers to the time stored in the compression-management table in order to determine operation information to be subjected to the compression process and the packaging process, performs the compression process and the packaging processes on the operating information to be subjected to the compression process and the packaging process, and, when the compression process and the packaging process are completed, records the latest time of the processed operation information in the compression-management table.

2. The linking server according to claim 1, wherein the acquisition process for acquiring the one or more pieces of operating information from the management server by the input/output unit, the output process for outputting the compressed data to the external system by the input/output unit, and the compression process and packaging process by the packaging unit are performed asynchronously.

3. The linking server according to claim 1, wherein the packaging unit
sets the range of operating information that will be the target of performing the compression process and the packaging process as operating information of the operating information having a newer time than the time recorded in the compression-management table up to the operating information having a time that is a set time before the current time.

4. An information processing method that is executed by a computer that acquires one or more pieces of operating information that is outputted from a management server that collects one or more pieces of operating information from one or more image forming apparatus, and stores the acquired one or more pieces of operating information in a storage unit;

acquires the one or more pieces of operating information that is stored in the storage unit, generates compressed data by performing a compression process and a packaging process, and writes the generated compressed data back in the storage unit; and outputs the compressed data that is written back in the storage unit to an external system that performs processing using the one or more pieces of operating information; and wherein the storage unit stores a compression-management table in which a time of the most recent operating information of the operating information that is processed last by the packaging unit is recorded; and the computer determines whether or not new unprocessed operating information to be subjected to the compression process is stored in the storage unit, when there is the new operating information, refers to the time stored in the compression-management table in order to determine operation information to be subjected to the compression process and the packaging process, performs the compression process and the packaging processes on the operating information to be subjected to the compression process and the packaging process, and when the compression process and the packaging process are completed, records the latest time of the processed operation information in the compression-management table.

* * * * *